United States Patent
Faber et al.

(10) Patent No.: US 9,667,921 B2
(45) Date of Patent: May 30, 2017

(54) METHOD AND DEVICE FOR PROVIDING A SIGNAL FOR A LIGHT CONTROL UNIT

(75) Inventors: Petko Faber, Renningen (DE); Gregor Schwarzenberg, Calw (DE)

(73) Assignee: ROBERT BOSCH GMBH, Stuttgart (DE)

( * ) Notice: Subject to any disclaimer, the term of this patent is extended or adjusted under 35 U.S.C. 154(b) by 388 days.

(21) Appl. No.: 14/008,281

(22) PCT Filed: Mar. 22, 2012

(86) PCT No.: PCT/EP2012/055083
§ 371 (c)(1),
(2), (4) Date: Dec. 5, 2013

(87) PCT Pub. No.: WO2012/130715
PCT Pub. Date: Oct. 4, 2012

(65) Prior Publication Data
US 2014/0085468 A1 Mar. 27, 2014

(30) Foreign Application Priority Data
Mar. 31, 2011 (DE) .................. 10 2011 006 554

(51) Int. Cl.
*B60Q 1/08* (2006.01)
*B60Q 1/04* (2006.01)
(Continued)

(52) U.S. Cl.
CPC ............. *H04N 7/183* (2013.01); *B60Q 1/143* (2013.01); *G01S 13/867* (2013.01);
(Continued)

(58) Field of Classification Search
CPC .......... B60Q 2300/056; B60Q 2300/42; B60Q 2300/41; B60Q 1/143; B60Q 1/1423;
(Continued)

(56) References Cited

U.S. PATENT DOCUMENTS

| 5,646,614 A | 7/1997 | Abersfelder et al. |
| 6,343,869 B1 | 2/2002 | Kobayashi |

(Continued)

FOREIGN PATENT DOCUMENTS

| CN | 1602260 A | 3/2005 |
| CN | 101391589 A | 3/2009 |

(Continued)

OTHER PUBLICATIONS

International Search Report for PCT/EP2012/055083, issued on Jun. 22, 2012.

*Primary Examiner* — Dave Czekaj
*Assistant Examiner* — Alison Slater
(74) *Attorney, Agent, or Firm* — Gerard Messina

(57) ABSTRACT

A method for providing a signal to a light control unit of at least one headlight of a vehicle that has a camera for acquiring a surrounding environment of a vehicle, the method including a step of determination of an interval between the vehicle and another vehicle using the camera. The method further includes a step of determination of a distance between the vehicle and the other vehicle using a camera-independent sensor. In addition, the method includes a step of plausibilization of the interval using the distance, the interval being plausibilized if a difference between the interval and the distance is smaller than a tolerance value. Finally, the method includes a step of provision the interval via an interface to a light control unit of the headlight.

10 Claims, 4 Drawing Sheets

(51) Int. Cl.
G01S 13/00 (2006.01)
G01S 13/86 (2006.01)
H04N 7/18 (2006.01)
B60Q 1/14 (2006.01)

(52) U.S. Cl.
CPC .... *B60Q 2300/056* (2013.01); *B60Q 2300/41* (2013.01); *B60Q 2300/42* (2013.01); *B60W 2550/308* (2013.01)

(58) Field of Classification Search
CPC .. B60Q 2300/43; B60Q 1/0023; B60Q 9/007; G01S 13/867; G01S 13/931; G01S 17/023; G01S 2013/9375; G01S 17/936; G01S 2007/403; G06K 9/00825; G06K 2209/23
See application file for complete search history.

(56) References Cited

U.S. PATENT DOCUMENTS 6,587,573 B1 * 7/2003 Stam .................. B60Q 1/085
340/930

| 2003/0107323 | A1 * | 6/2003 | Stam | F21S 48/171 315/82 |
| 2007/0057837 | A1 * | 3/2007 | Huizing | G01S 13/867 342/52 |
| 2007/0171121 | A1 * | 7/2007 | Munakata | G01S 13/931 342/55 |
| 2008/0180528 | A1 * | 7/2008 | Saito | G06K 9/00825 348/148 |
| 2009/0254247 | A1 * | 10/2009 | Osanai | B60Q 1/143 701/36 |

FOREIGN PATENT DOCUMENTS

| DE | 4336288 | 3/1995 |
| DE | 19756574 | 10/1998 |
| DE | 10149115 | 4/2003 |
| DE | 102005047331 | 4/2007 |
| DE | 102007045150 | 4/2008 |
| DE | 102007010205 | 9/2008 |
| DE | 102007022245 | 11/2008 |
| EP | 1964717 | 9/2008 |
| EP | 2088365 | 8/2009 |
| EP | 2230128 | 9/2010 |

* cited by examiner

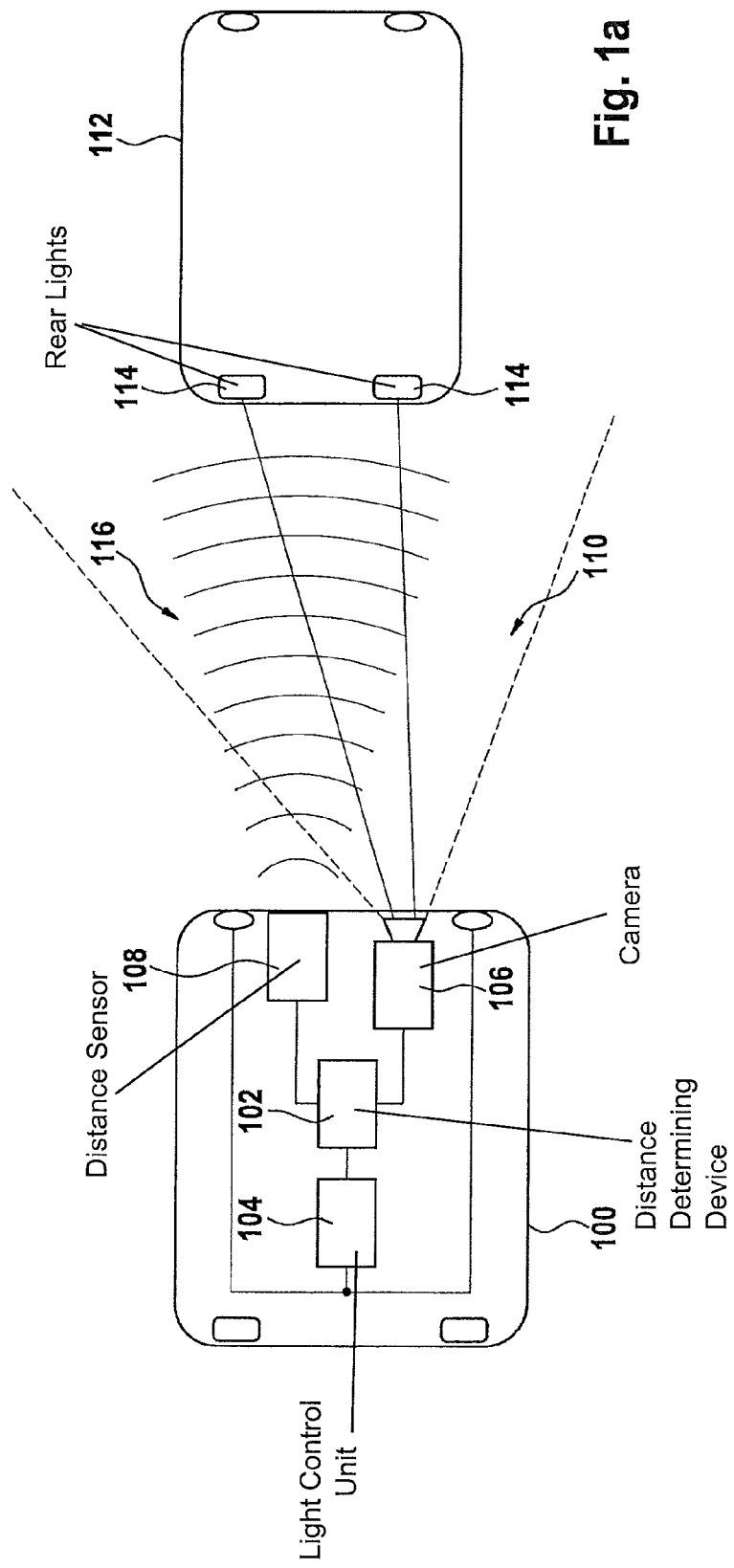

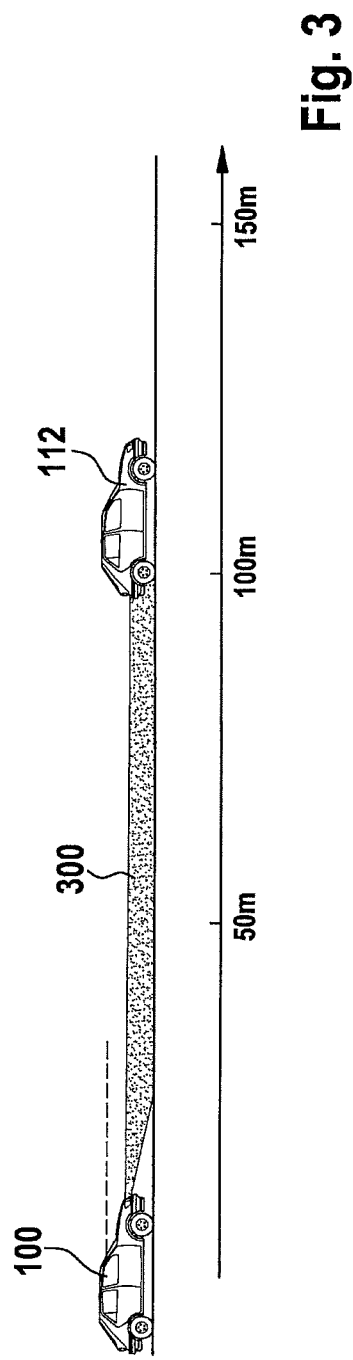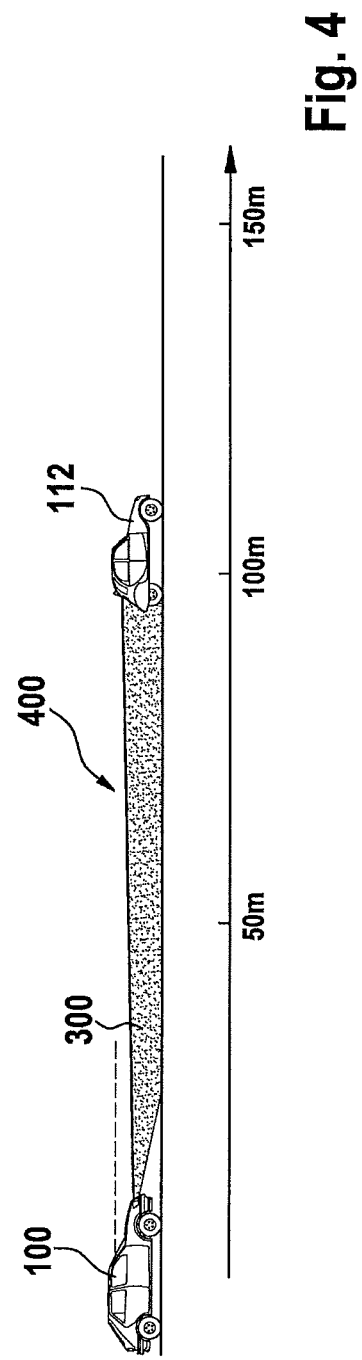

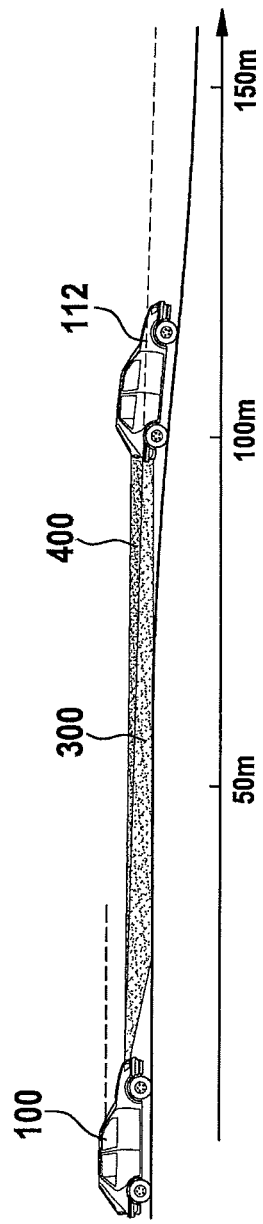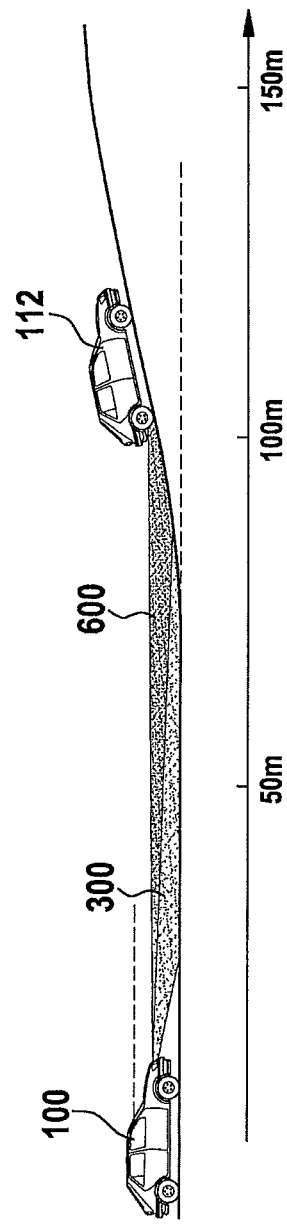

METHOD AND DEVICE FOR PROVIDING A SIGNAL FOR A LIGHT CONTROL UNIT

FIELD OF THE INVENTION

The present invention relates to a method for providing a signal for a light control unit, to a device for providing a signal for light control unit, and to a corresponding computer program product.

BACKGROUND INFORMATION

In order to avoid blinding other traffic participants, it is important to determine the distance from a vehicle traveling in front.

German Patent No. 43 36 288 describes a device for monitoring the rear or front space of a parking motor vehicle using a video camera having an image sharpness control that can follow an object, once recognized, with sharpness over the entire search field, using autofocus.

The device uses this property for an image-processing-supported tracking of the viewing angle of a video camera that is pivotable and can be inclined, whereby an object limiting the rear-side or front-side penetration depth of the vehicle can be viewed up until contact with the bumper.

SUMMARY

Against this background, the present invention provides a method for providing a signal for a light control unit, a device for providing a signal for a light control unit, and a corresponding computer program product.

Given an active headlight range regulation of the vehicle using a detection of lights of another traffic participant, a headlight of the vehicle is wrongly adjusted if the light of the other traffic participant is fixed at a large distance from the ground. If an overly large vertical angle to the light of the other traffic participant is determined, and the headlight range of the headlight is set such that an upper light-dark cutoff runs below the light of the other traffic participant, the other traffic participant may nonetheless be blinded.

The present invention is based on the recognition that a camera-based distance determination has a system-caused error. This can be up to 15% of the determined distance. Therefore, it is advantageous to ensure the accuracy of a camera-based distance value using a camera-independent sensor, for example a radar sensor. In this way, a headlight range of headlights of a vehicle can be adjusted to a distance whose determination has been ensured, thus resulting in an improved illumination of the roadway in front of the vehicle without blinding other traffic participants.

The present invention creates a method for providing a signal for a light control unit of at least one headlight of a vehicle, having a camera for acquiring a surrounding environment of a vehicle, the method including the following steps:

determination of an interval between the vehicle and another vehicle, using the camera;
determination of a distance between the vehicle and the other vehicle using a camera-independent sensor;
plausibilization of the interval using the distance, the interval being plausibilized when a difference between the interval and the distance is smaller than a tolerance value; and
provision of the interval via an interface to the light control unit of the headlight.

In addition, the present invention creates a device for providing a signal for a light control unit of at least one headlight of a vehicle, having a camera for acquiring a surrounding environment of a vehicle, the device including the following features:

a device for determining an interval between the vehicle and another vehicle using the camera;
a device for determining a distance between the vehicle and the other vehicle using a camera-independent sensor;
a device for plausibilization of the interval using the distance, the interval being plausibilized when a difference between the interval and the distance is smaller than a tolerance value; and
an interface for providing the interval to the light control unit of the headlight.

A light control unit may be understood as a control device for operating one or more headlights of a vehicle with signals required for the operation of the headlight. The light control unit can be integrated in the headlight; it may also be realized apart from the headlight, as a separate component. A surrounding environment of a vehicle can be a region around the vehicle. In particular, the surrounding environment of a vehicle can include a roadway in a driver's field of view in front of the vehicle. An interval and a distance may be understood as a spatial removal. For example, the interval or the distance may be understood as a path length between the vehicle and the other vehicle. A camera-independent sensor may be understood as an active sensor having a transmit device and a receive device. The camera-independent sensor can transmit a signal to the other vehicle using the transmit device, and can receive a portion of the signal reflected by the other vehicle using the receive device. The distance can be determined from a runtime of the signal and a signal speed in the medium between the vehicle and the other vehicle. The camera-independent sensor can for example be a laser sensor, an ultrasound sensor, or a radar sensor. A plausibilization may be understood as a comparison. For example, the plausibilization can be a go/no-go comparison with a comparison table. A difference between the interval and the distance can be understood as a difference in length between the interval and the distance.

In a further specific embodiment of the present invention, in the first determination step the interval can be determined based on a comparison of an angle between two light objects of a light object pair of the other vehicle with an expected angle, the angle being determined from a camera image. A light object pair can be understood for example as a pair of rear lights of a vehicle traveling in front, or two headlights of an oncoming vehicle. An angle between two light objects may be understood as an angle at a point of intersection between a first light beam at a first of the light objects and a second light beam at the second of the light objects. For example, the angle can be represented by an interval between a first pixel image of the first light object and a second pixel image of the second light object on an imaging plane of the camera. The point of intersection of the light beams can be located behind a focus plane of the camera. An expected angle may be understood as a stored expected value for the angle. For example, the expected angle can correspond to an interval of the light object from the vehicle and can be stored in a comparison table, and the allocated interval can be outputted when the relevant angle is determined. In this way, the spatial removal from the other vehicle can be estimated easily and quickly. No complicated object recognition is required for such a determination of the interval.

According to a further specific embodiment of the present invention, in the first determination step the interval can be determined based on a horizontal angle between the two light objects of the light object pair and based on an expected horizontal angle, the expected angle representing an averaged intermediate space between two vehicle lights. An averaged intermediate space between two vehicle lights may be understood as an average value, representative for a large number of different vehicles, of an intermediate space, where the intermediate space can be smaller than an upper boundary value and greater than a lower boundary value. The different vehicles can for example be members of a higher-order unified class of vehicles; thus, the different vehicles may have a class of common class features, such as for example a common outer dimension range. In this way, detection of light objects that are not part of the vehicle can be avoided, because the determination of the interval of the two light objects takes place via the horizontal angle, and it is not necessary to take into account an oblique position of the vehicle, so that the computing expense for the interval determination can be reduced.

In addition, in the first determination step a height angle to the other vehicle can be determined, and in the provision step the height angle can in addition be provided to the light control unit. The terrain in front of the vehicle can either reduce the headlight range, if there is an upward incline in front of the vehicle, or the terrain can increase the headlight range and thus result in blinding of a vehicle driving in front, if there is a downward incline in front of the vehicle. A height angle may be understood as an angle at a point of intersection between a horizontal plane and a beam to the light source. For example, an interval between a pixel image of the light source in a focus plane of the camera and a virtual horizon plane can represent the height angle. The virtual horizon plane can for example be provided by an artificial horizon, or may be a stored horizon plane at an initialization state. Through provision of the height angle, an upper light-dark cutoff of a headlight cone can be adapted to a roadway contour. If the other vehicle is situated above or below the vehicle, the upper light-dark cutoff can be adapted upward or downward.

In a further specific embodiment, in the first determination step the interval can be determined using an item of information about an angle between a light source and an expected horizon plane, if the camera acquires only one light source on the other vehicle. An item of angle information may be understood as a height angle. An expected horizon plane can be a horizontal plane stored or determined in an earlier calibration step. The horizon plane can be represented by a horizontal division of a sensor of the camera. Here, the interval can be larger the closer an image of the light source is to the horizon plane. Through evaluation of this angle information, an item of interval information can also be estimated if the other vehicle has only one functioning light. A determination of the spatial removal from a motorcycle is also possible in this way.

According to a further specific embodiment of the present invention, in the second determination step the distance can be determined using a radar sensor. A radar sensor can be an active radar transmitter and receiver. Here, the receiver can be installed at a location apart from the transmitter. The radar sensor can send out electromagnetic energy and can receive electromagnetic energy reflected by an object, for example by the vehicle traveling in front. The distance can be determined from a time duration between a time of the sending out and a time of the reception. A radar sensor can be used particularly advantageously because radar waves are preferably reflected by metal objects such as a vehicle and are not influenced by weather conditions. In addition, as a result of its design a radar sensor detects only objects larger than a frequency-dependent minimum size.

In addition, according to a further specific embodiment, in the first determination step at least one horizontal direction to the other vehicle can additionally be determined, and in the second determination step the distance from the vehicle traveling in front can in addition be determined using at least the horizontal direction. For example, the horizontal direction can be determined relative to a mid-axis of the vehicle. Through the use of the horizontal direction in the second determination step, the camera-independent sensor can send out the energy in focused form in the direction toward the other vehicle. In this way, a high energy density can be achieved at the other vehicle, and a strong echo can come back to the camera-independent sensor. In addition, the interpretation of wrongly received echoes as a useful signal can be avoided, because a directed reception of the echo is carried out, so that reception of radar echoes is possible only from a particular direction.

In an additional specific embodiment, in the provision step an additional safety parameter for the light control can be used if the interval is not plausibilized in the plausibilization step. A safety parameter may be understood as an item of information intended to prevent blinding. For example, the safety parameter may be an item of information concerning a precautionary reduction of the headlight range that is to be carried out. In this way, an error that may be contained in the camera-supported measurement can be compensated. The safety parameter can be determined in a preceding test run.

Also advantageous is a computer program product having program code that can be stored on a machine-readable bearer such as a semiconductor storage device, a hard drive storage device, or an optical storage device, and can be used to carry out the method according to one of the specific embodiments described above when the program is executed on a device or on an apparatus corresponding to a computer.

BRIEF DESCRIPTION OF THE DRAWINGS

FIG. 1a shows a representation of a vehicle having a device according to an exemplary embodiment of the present invention.

FIGS. 3 through 6 show representations of various driving situations and resulting light situations, with and without blinding.

DETAILED DESCRIPTION

Figure 1B:
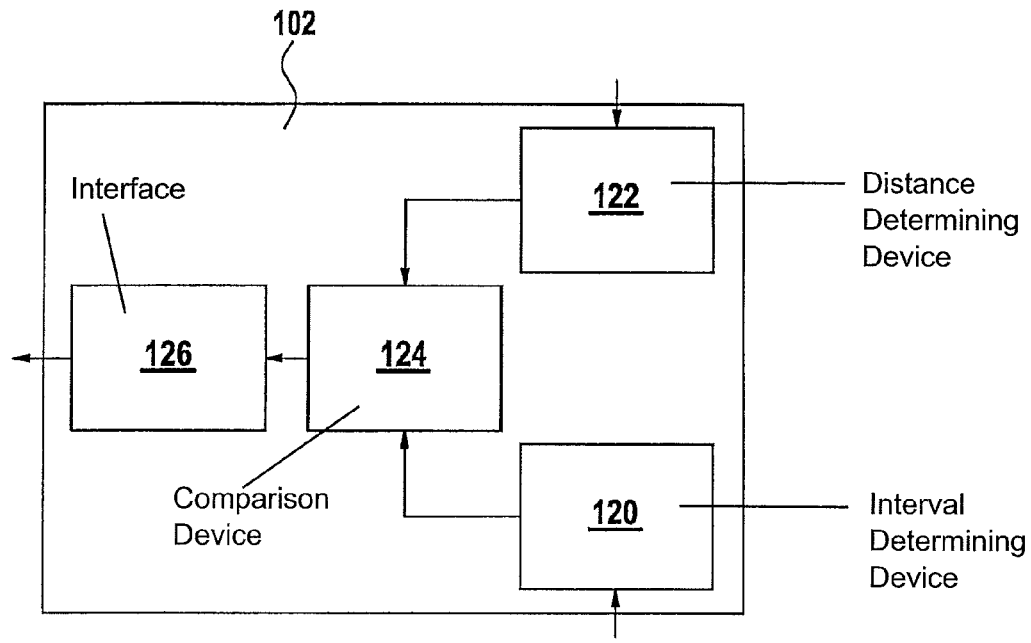
FIG. 1b shows a representation of a device for providing a signal to a light control unit according to an exemplary embodiment of the present invention.

In the following description of preferred exemplary embodiments of the present invention, identical or similar reference characters are used for elements shown in the various Figures and having similar functions, so that repeated description of these elements is omitted.

FIG. 1a shows a representation of a vehicle 100 having a device 102 for providing a signal to a light control unit 104 according to an exemplary embodiment of the present invention. Vehicle 100 has a camera 106 and a camera-independent distance sensor 108. A vehicle in front 112 is situated in an acquisition region 110 of camera 106. Two rear lights 114 of vehicle in front 112 are situated at a distance from one another. From a point of view of camera 106, rear lights 114 of vehicle in front 112 have a measurable angle to one another. In an imaging plane of camera 106, image points representing rear lights 114 have a smaller interval from one another. The larger the reduced interval in the imaging plane of camera 106 is, the greater is the angle that rear lights 114 have to one another from the point of view of camera 106, and the smaller is an interval between vehicle 100 and vehicle traveling in front 112. In device 102, the interval between the two vehicles 100, 112 is determined from image information of camera 106. In addition, a lateral direction to vehicle in front 112 and/or a height direction to rear lights 114 can be determined from vehicle 100.

Corresponding to the interval determination, device 102 requests a measurement from camera-independent distance sensor 108. For this purpose, distance sensor 108 sends out a signal 116 in the direction toward vehicle in front 112. Signal 116 can be directional. Signal 116 is reflected by vehicle in front 112 and partly comes back to vehicle 100 as an echo. Distance sensor 108 receives the echo (not shown). In device 102, a distance between home vehicle 100 and vehicle in front 112 is determined. The determined distance and the determined interval are compared to one another in device 102. If the distance is within a tolerance range around the interval, then the interval is plausibilized. If the distance is not within the tolerance range around the interval, then the interval is not plausibilized. Depending on whether the interval has been plausibilized or not, device 102 provides a signal to light control unit 104 in order to set a headlight range of headlights of vehicle 100 in such a way that a driver of vehicle in front 112 is not blinded. If the interval has not been plausibilized, the signal can include a safety parameter. For example, the headlight range of the headlights can then be reduced by a specified amount in order to ensure that the driver of vehicle in front 112 is not blinded.

FIG. 1b shows a representation of a device 102 for providing a signal for a light control unit according to an exemplary embodiment of the present invention. Device 102 has a device 120 for determining an interval, a device 122 for determining a distance, a device 124 for plausibilizing the interval, and an interface 126 for providing the interval. Device 120 is fashioned to use a camera of a vehicle to determine the interval between the vehicle and another vehicle. Device 122 is fashioned to use a camera-independent sensor to determine the distance between the vehicle and the other vehicle. Device 124 is fashioned to compare the interval to the distance and to plausibilize the interval if a difference between the interval and the distance is smaller than a tolerance value. Interface 126 is fashioned to provide the interval between the vehicle and the vehicle in front to a light control unit of at least one headlight of the vehicle.

Figure 2:
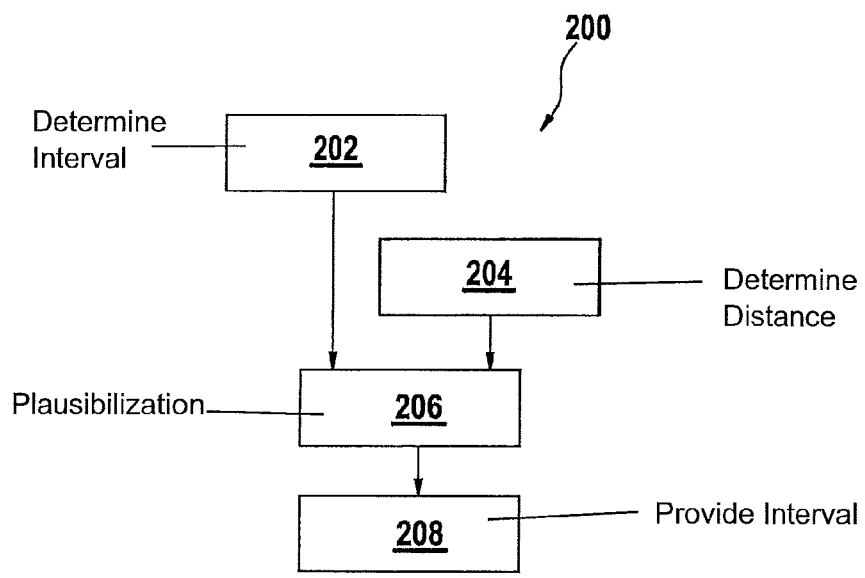
FIG. 2 shows a flow diagram of a method for providing a signal to a light control unit according to an exemplary embodiment of the present invention.

FIG. 2 shows a flow diagram of a method 200 for providing a signal to a light control unit of at least one headlight of a vehicle according to an exemplary embodiment of the present invention. The vehicle has a camera that is fashioned in order to acquire an environment surrounding the vehicle. The method has a first determination step 202, a second determination step 204, a plausibilization step 206, and a provision step 208.

In determination step 202, the camera is used to determine an interval between the vehicle and another vehicle. For this purpose, for example an interval of image points on a sensor of the camera can be evaluated. Headlights of the other vehicle, preferably rear lights or front headlights, are imaged as light objects on the sensor. If the other vehicle has a first and a second front headlight or rear light, the first front headlight is situated at an interval from the second front headlight. Due to legal regulations, the interval between the headlights may not exceed a maximum value and may not be less than a minimum value. Within a tolerance range between the minimum value and the maximum value, an averaged interval value can be specified that approximately represents a headlight interval for a large number of different vehicles. The averaged interval value can be compared to the interval of the image points on the sensor, and from this an interval of the other vehicle from the home vehicle can be determined to a good approximation.

In determination step 204, using a camera-independent sensor of the vehicle a distance is determined between the vehicle and the other vehicle. For this purpose, for example there can take place an evaluation of a signal runtime that a signal of the camera-independent sensor requires to travel from a transmitter of the sensor to the other vehicle, be reflected there, and travel back to a receiver of the sensor. The distance can be determined taking into account a signal speed in air between the home vehicle and the other vehicle, and taking into account the resulting signal runtime.

In plausibilization step 206, the interval is plausibilized using the distance if a difference between the interval and the distance is smaller than a tolerance value. If the difference between the interval and the distance is greater than the tolerance value, the interval is not plausibilized. In this way, the light control unit can be prevented from controlling the headlights in such a way as to blind drivers. Likewise, it is possible to leave out of account an incorrectly determined distance, determined for example if the camera-independent sensor determines a signal runtime to an object that is not the other vehicle.

In provision step 208, the interval is provided via an interface to a light control unit of at least one headlight of the home vehicle. Using this, the light control unit can set a headlight range of the headlight in such a way that a driver of the other vehicle is not blinded.

In other words, FIG. 2 shows a plausibilized estimation of distance through sensor data fusion for a light control unit, for example based on estimated vertical and/or horizontal angles and the estimated distance from a regulation-relevant object. For a video-based light controlling in the vehicle, in addition to the information concerning the position of the light objects in the image the information concerning the estimated distance is also relevant to avoid blinding, e.g. in the case of vehicles having high rear lights, or in order to ensure optimal illumination given the regulation-relevant objects that are present, and given the existing topography of the roadway surface. Currently used approaches to distance estimation for light functions are purely video-based, which, based on the model used, entails an error of 15%. The imprecision of the estimation that is to be accepted is a result of the assumption of an average interval between paired light objects such as a rear light pair or a headlight pair, the headlight intervals for trucks, buses, campers, or extra-wide vehicles not being taken into account in the current estimation. If the vehicle type, such as passenger vehicle, truck, etc., is taken into account in the distance estimation, the estimation can be improved, but a certain degree of modeling error will nonetheless still be present.

An error arising from a permissible oblique position of a vehicle will be completely neglected in the distance estimation in order to reduce calculating expense. However, the oblique position can also be taken into account through an adaptation.

If an interval-measuring sensor, preferably a radar sensor with angular resolution, is present in a vehicle, it can be used to obtain a valid distance estimation at close range up to about 200 m, but at least up to the maximum range of the sensor.

In a first step 202, the distance from the light object is estimated for example using a video-based approach, via an average interval of paired light objects. For vehicles having only one light source, a distance can be estimated via the interval from the light source to the estimated horizon and the calibration information of the camera.

In a second step 204, a request for measurement is sent for example to the additional sensor based on the previously estimated angular information.

In a third step 206, for example the value estimated in this way is plausibilized using the initially estimated distance value. If the estimation of the value of the additional sensor is within the range of tolerance of the initial distance value, this estimation can be used as an additional parameter for the light controlling without limitation. If, in contrast, the distance estimation is outside the tolerance range, the initial estimation value is used as an input for the light controlling, with the limitation that the value is falsified under some circumstances by the error due to the modeling.

FIG. 3 shows a representation of a vehicle 100 on a straight roadway having a flat roadway surface, and a vehicle 112 traveling in front. In the representation, below the roadway a distance axis is shown having its origin at home vehicle 100. On the distance axis, distances of from 0 to 150 m are indicated in 50 m steps. In this situation, vehicle in front 112 is situated approximately 80 m in front of vehicle 100. Vehicle 100 is traveling using its lights. A headlight cone 300 is radiated by the headlights of vehicle 100, and illuminates the roadway between vehicle 100 and vehicle in front 112. A headlight range of headlight cone 300 is set such that an upper light-dark cutoff of headlight cone 300 is situated at the height of rear lights of vehicle in front 112. In this way, a blinding of a driver of vehicle in front 112 is avoided. This representation shows an ideal situation. Here, for a correct setting of headlight cone 300 no information about topography is required, because a straight roadway is shown.

FIG. 4 shows a representation of a vehicle 100 on a flat roadway having a vehicle in front 100. As in FIG. 3, underneath the roadway a distance axis is shown having its origin at vehicle 100. On the distance axis, distances of from 0 to 150 m are indicated in 50 m steps. In the situation shown here, vehicle in front 112 is again approximately 80 m removed from vehicle 100. Vehicle 100 travels using its lights. A headlight cone 300 is radiated by headlights of vehicle 100, and illuminates the roadway between vehicle 100 and vehicle in front 112. A headlight range of headlight cone 300 is set such that an upper light-dark cutoff of headlight cone 300 is situated at the height of rear lights of vehicle in front 112. Because vehicle in front 112 has high rear lights, here there is a blinding 400 of a driver of vehicle in front 112. Given the use of a method for providing a signal to a light control device of vehicle 100 according to an exemplary embodiment of the present invention, in this case a headlight range of headlight cone 300 is reduced on the basis of an interval to the vehicle traveling in front, and therefore the upper light-dark cutoff of headlight tone 300 is lowered, because a non-blinding headlight range is smaller than the headlight range shown here, based on the distance between vehicle 100 and vehicle in front 112.

FIG. 5 shows a representation of a vehicle 100 with a vehicle in front 112 on a roadway having a slight downward incline. As in FIG. 3, a distance axis having its origin at vehicle 100 is shown under the roadway. On the distance axis, distances of from 0 to 150 m are indicated in 50 m steps. In the situation shown here, vehicle in front 112 is approximately 100 m removed from vehicle 100. Vehicle 100 is traveling using lights. A headlight cone 300 is radiated by headlights of vehicle 100, and illuminates the roadway between vehicle 100 and vehicle in front 112. Because no information about topography is given, a headlight range of headlight cone 300 is set such that an upper light-dark cutoff of headlight cone 300 would be situated, given a flat roadway, at the height of rear lights of vehicle in front 112. Because vehicle in front 112 is traveling downhill on the slight downward incline, and is thus situated below home vehicle 100, there occurs a blinding 400 of a driver of vehicle in front 112, because headlight cone 300 penetrates into the interior of the vehicle due to an oblique position of vehicle in front 112. Given the use of a method for providing a signal for a light control device of vehicle 100 according to an exemplary embodiment of the present invention, in this case a headlight range of headlight cone 300 would be reduced, and therefore the upper light-dark cutoff of headlight cone 300 would be lowered, because vehicle in front 112 is situated below vehicle 100 on the slight downward incline.

FIG. 6 shows a representation of a vehicle 100 with a vehicle in front 112 on a roadway having a slight upward incline. As in FIG. 3, a distance axis having its origin at vehicle 100 is shown under the roadway. On the distance axis, distances of from 0 to 150 m are indicated in 50 m steps. In the situation shown here, vehicle in front 112 is approximately 100 m removed from vehicle 100. Vehicle 100 is traveling using lights. A headlight cone 300 is radiated by headlights of vehicle 100, and illuminates the roadway in front of vehicle 100. Because no information about the topography of the roadway in front of vehicle 100 is given, and only limited distance information is given concerning vehicle in front 112, a headlight range of headlight cone 300 is set such that an upper light-dark cutoff of headlight cone 300 would be situated, given a flat roadway, at the height of rear lights of vehicle in front 112. Because vehicle in front 112 is traveling uphill on the slight upward incline, the headlight cone does not reach vehicle in front 112. Due to this, the roadway is not ideally illuminated between vehicle 100 and vehicle in front 112. Given the use of a method for providing a signal to a light control of vehicle 100 according to an exemplary embodiment of the present invention, in this case upper light-dark cutoff 600 of headlight cone 300 would be raised, and in this way the roadway would be completely illuminated between vehicle 100 and the vehicle in front, because vehicle in front 112 is situated above vehicle 100 on the slight upward incline.

The exemplary embodiments described and shown in the Figures have been selected only as examples. Different exemplary embodiments may be combined with one another in their entirety or with regard to individual features. An exemplary embodiment may also be supplemented by features of a different exemplary embodiment.

In addition, method steps according to the present invention may be repeated, and may be executed in a sequence differing from the described sequence.

If an exemplary embodiment includes an "and/or" linkage between a first feature and a second feature, this may be read as meaning that the exemplary embodiment has, according to one specific embodiment, both the first feature and the second feature, and according to a further specific embodiment has either only the first feature or only the second feature.

The invention claimed is:

1. A method comprising:
   determining a first distance between a host vehicle and a target vehicle, using a camera image of an environment surrounding the host vehicle;
   determining a second distance between the host vehicle and the target vehicle, using a camera-independent sensor;
   determining a distance difference between the first distance and the second distance;
   comparing the distance difference to a predefined fixed threshold tolerance value to obtain a comparison result; and
   executing a procedure by which, in accordance with a determination that the comparison result is that the distance difference satisfies a condition that the distance difference is less than the predefined fixed threshold tolerance value, the first distance is provided via an interface to a light control unit of at least one headlight of the host vehicle and a headlight range of the at least one headlight is set by the light control unit using the first distance;
   wherein at least one of the following:
      the determining the first distance includes (a) determining an angle that is formed by, and the vertex of which is at, an intersection of light beams of two light objects, wherein the two light objects are imaged in the camera image and are of a light object pair of the target vehicle, and (b) comparing the determined angle to an expected angle;
      the method further comprises determining a horizontal direction to the target vehicle, and, for determining the second distance, directing the camera-independent sensor in the determined horizontal direction; and
      the executed procedure provides that, in accordance with, and responsive to, a determination that the comparison result is that the distance difference does not satisfy the condition, the headlight range of the at least one headlight is set by the light control unit using a safety parameter instead of the first distance.

2. The method as recited in claim 1, wherein the step of determining the first distance includes the determining of the intersecting angle of the light beams and comparing the determined angle to the expected angle.

3. The method as recited in claim 1, wherein the step of determining the first distance includes:
   determining a horizontal angle between the two light objects of a light object pair of the target vehicle using the camera image; and
   comparing the horizontal angle to an expected horizontal angle, the expected horizontal angle representing an averaged intermediate space between two vehicle lights.

4. The method as recited in claim 1, further comprising:
   determining a height angle of the target vehicle, and
   providing the height angle to the light control unit.

5. The method as recited in claim 1, wherein the step of determining the first distance is performed using an item of information about an angle between a light source and an expected horizon plane, if the camera image includes only one light source on the other vehicle.

6. The method as recited in claim 1, wherein the second distance is determined using a radar sensor.

7. The method as recited in claim 1, wherein the method includes the step of determining the horizontal direction to the target vehicle, and, for determining the second distance, directing the camera-independent sensor in the determined horizontal direction.

8. The method as recited in claim 1, wherein the executed procedure provides that, in accordance with, and responsive to, the determination that the comparison result is that the distance difference does not satisfy the condition, the headlight range of the at least one headlight is set by the light control unit using the safety parameter instead of the first distance.

9. A device comprising:
   processing circuitry;
   a light control unit; and
   an interface via which the processing circuitry is coupled to the light control unit;
   wherein:
      the processing circuitry is configured to:
         determine a first distance between a host vehicle and a target vehicle, using a camera image of an environment surrounding the host vehicle;
         determine a second distance between the host vehicle and the target vehicle, using a camera-independent sensor;
         determine a distance difference between the first distance and the second distance;
         compare the distance difference to a predefined fixed threshold tolerance value to obtain a comparison result; and
         execute a procedure by which, in accordance with a determination that the comparison result is that the distance difference satisfies a condition that the distance difference is less than the predefined fixed threshold tolerance value, the first distance is provided by the processing circuitry to the light control unit, which is configured to responsively set a headlight range of at least one headlight using the first distance; and
      at least one of the following:
         the determination of the first distance includes (a) determining an angle that is formed by, and the vertex of which is at, an intersection of light beams of two light objects, wherein the two light objects are imaged in the camera image and are of a light object pair of the target vehicle, and (b) comparing the determined angle to an expected angle;
         the processing circuitry is further configured to determine a horizontal direction to the target vehicle, and, for determining the second distance, direct the camera-independent sensor in the determined horizontal direction; and
         the procedure, which the processing circuitry is configured to execute, further provides that, in accordance with, and responsive to, a determination that the comparison result is that the distance difference does not satisfy the condition, the processing circuitry provides a safety parameter to the light control unit which the light control unit is configured to responsively use to set the headlight range of the at least one headlight instead of the first distance.

10. A non-transitory computer readable storage medium on which is stored a computer program that is executable by a processor and that, when executed by the processor, causes the processor to perform a method, the method comprising:

determining a first distance between a host vehicle and a target vehicle, using a camera image of an environment surrounding the host vehicle;

determining a second distance between the host vehicle and the target vehicle, using a camera-independent sensor;

determining a distance difference between the first distance and the second distance;

comparing the distance difference to a predefined fixed threshold tolerance value to obtain a comparison result; and executing a procedure by which, in accordance with a determination that the comparison result is that the distance difference satisfies a condition that the distance difference is less than the predefined fixed threshold tolerance value, the first distance is provided via an interface to a light control unit of at least one headlight of the host vehicle and a headlight range of the at least one headlight is set by the light control unit using the first distance;

wherein at least one of the following:

the determining the first distance includes (a) determining an determining an angle that is formed by, and the vertex of which is at, an intersection of light beams of two light objects, wherein the two light objects are imaged in the camera image and that are of a light object pair of the target vehicle, and (b) comparing the determined angle to an expected angle;

the method further comprises determining a horizontal direction to the target vehicle, and, for determining the second distance, directing the camera-independent sensor in the determined horizontal direction; and the executed procedure provides that, in accordance with, and responsive to, a determination that the comparison result is that the distance difference does not satisfy the condition, the headlight range of the at least one headlight is set by the light control unit using a safety parameter instead of the first distance.

* * * * *